(12) United States Patent
Eriksson et al.

(10) Patent No.: US 10,284,677 B2
(45) Date of Patent: *May 7, 2019

(54) METHOD AND APPARATUS FOR OBTAINING CONTENT FROM A MEDIA SERVER

(71) Applicant: TELEFONAKTIEBOLAGET LM ERICSSON (PUBL), Stockholm (SE)

(72) Inventors: Hans Eriksson, Sollentuna (SE); Lars Westberg, Enköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 236 days.

This patent is subject to a terminal disclaimer.

(21) Appl. No.: 15/115,167

(22) PCT Filed: Jan. 31, 2014

(86) PCT No.: PCT/SE2014/050128
§ 371 (c)(1),
(2) Date: Jul. 28, 2016

(87) PCT Pub. No.: WO2015/115952
PCT Pub. Date: Aug. 6, 2015

(65) Prior Publication Data
US 2016/0352851 A1 Dec. 1, 2016

(51) Int. Cl.
*G06F 15/167* (2006.01)
*H04L 29/08* (2006.01)
(Continued)

(52) U.S. Cl.
CPC ...... *H04L 67/288* (2013.01); *G06F 17/30887* (2013.01); *G06F 17/30902* (2013.01);
(Continued)

(58) Field of Classification Search
USPC ....... 709/217, 219, 223, 227, 203, 206, 213, 709/224, 226, 228, 230, 232; 726/15
See application file for complete search history.

(56) References Cited

U.S. PATENT DOCUMENTS 6,823,377 B1 11/2004 Wu et al.
7,089,325 B1 8/2006 Murtza et al.
(Continued)

FOREIGN PATENT DOCUMENTS

CN 102104636 A 6/2011
CN 103477335 A 12/2013

OTHER PUBLICATIONS

OpenNetInf Documentation Design and Implementation, Technical Report TR-RI-11-314, University of Paderborn Computer Networks Group, Sep. 2011.
(Continued)

*Primary Examiner* — Quang N Nguyen

(57) ABSTRACT

A method performed by a communication network node of enabling retrieval of an object, such as an element of web-page, is provided. The location of the object is defined by a Uniform Resource Locator, URL, in a distributed caching system. The method comprises restructuring the URL into a format being readable by a DNS server, and sending a DNS query comprising the restructured URL to the DNS server. Furthermore, the method comprises receiving an IP-address of a cache in the distributed caching system, wherein the cache stores the object. Moreover, the method comprises sending an http-get request for the object to the cache having the received IP-address, and receiving an http-response comprising the object from the cache.

16 Claims, 6 Drawing Sheets

(51) Int. Cl.
*H04L 29/12* (2006.01)
*G06F 17/30* (2006.01)

(52) U.S. Cl.
CPC ........ *H04L 61/1511* (2013.01); *H04L 61/301* (2013.01); *H04L 61/303* (2013.01); *H04L 67/02* (2013.01); *H04L 67/28* (2013.01); *H04L 67/2842* (2013.01)

(56) References Cited

U.S. PATENT DOCUMENTS

| | | | | |
|---|---|---|---|---|
| 7,783,757 | B2 * | 8/2010 | Plamondon | H04L 67/2847 709/217 |
| 8,589,561 | B2 * | 11/2013 | Mukherjee | H04L 67/2814 709/227 |
| 8,646,067 | B2 * | 2/2014 | Agarwal | H04L 63/0227 726/15 |
| 8,701,010 | B2 * | 4/2014 | Plamondon | G06F 12/0862 709/219 |
| 9,276,997 | B2 * | 3/2016 | Mittal | G06F 17/30899 |
| 2012/0198043 | A1 * | 8/2012 | Hesketh | H04L 29/1265 709/223 |

OTHER PUBLICATIONS

Perino, et al., A Reality Check for Content Centric Networking, ICN '11, Aug. 19, 2011.

* cited by examiner

METHOD AND APPARATUS FOR OBTAINING CONTENT FROM A MEDIA SERVER

This application is a 371 of International Application No. PCT/SE2014/050128, filed Jan. 31, 2014, the disclosure of which is fully incorporated herein by reference.

TECHNICAL FIELD

The present disclosure relates to data management in distributed caching systems, especially it relates to retrieval of object data distributed at a plurality of caches.

BACKGROUND

With emergence of various information services, storage of data has been developed. Today, data to be downloaded by end users are typically stored at cache servers, from which the end users obtains data. WEB-servers are also referred to as caches and the term caches will be used in this description.

Each cache has a unique IP (Internet Protocol)-address, which is used to identify the cache when requesting data to be downloaded. Which cache to select for a specific service request, is based on the URL information that is translated into IP address by DNS lookup procedure. Typical information services where end users download data are web-page browsing, streamed music listening, streamed video watching, IPTV, streamed text reading, etc.

The term "object data" will be used throughout this description to denote data of object. Examples of objects may be elements or parts of any of: a web-page, a streamed session of music, video or text, a media file, an executable SW code, etc. An object is a specific information element of a Web page, etc., packetized as an object with its own unique DNS (Domain Name System) name pointing to a specific place where the object is stored. An object may be a static set of data, but may also vary dynamically with time. The content can also be created at the request of the content.

By distributing object data on a plurality of caches and arrange the caches at suitable locations, data traffic capacity may be optimised to meet the end user's needs. The same object may for instance be stored at a plurality of locations.

Thereby, the end user may select to download objects from domestic caches or will be redirected to domestic caches instead of downloading from caches abroad. Thereby load on bottlenecks, as intercontinental communication links, may be decreased and the end users may download the objects faster.

With reference to FIG. 1, which is a schematic overview, a scenario of retrieving object data will now be described.

In a caching system 100 objects of a web-page are distributed over a plurality of caches 102a, 102b, 102c. When an end user retrieves an object, his/her UE (User Equipment) 104 sends an http request, where the location of the object and the name of the object are included. For instance, the http request may be http-get://Cache_1/object_1, where Cache_1 is the domain name which is translated to an IP-address to the first cache 102a. In response to the http request, the first cache 102a returns the first object. The first cache 102a has information regarding that a second object, i.e. the subsequent object, is stored at a second cache 102b. The first cache 102a redirects the UE 104 to the second cache 102b, by sending the a new URL (which is translated to another IP-address to the second cache) of the second cache 102b to the UE 104, e.g. implemented as http-response Cache_2, where Cache_2 is the domain name of the second cache IP address of the second cache 102b. Each of the caches has knowledge of where subsequent objects to be retrieved are stored, e.g. the second cache 102b has information regarding a third object and will redirect to the third cache 102c.

In order to balance the load further in distributed caching systems there is a trend to increase the number of objects to be distributed and to distribute individual objects more widely. However, division of data into smaller objects is counteracted, e.g. due to the fact that the client has to respond to each redirecting between the caches, and that http redirecting is slow.

Thus there is a need to devise a faster retrieval of object data in distributed caching systems.

SUMMARY

It would be desirable to obtain improved performance when retrieving object data. It is an object of this disclosure to address at least any of the issues outlined above.

Further, it is an object to provide a mechanism for retrieval of object data in distributed caching systems. These objects may be met by a method and an arrangement according to the attached independent claims.

According to one aspect, a method performed by a communication network node (204) of enabling retrieval of an object, such as an element of web-page, is provided. The location of the object is defined by a Uniform Resource Locator, URL, in a distributed caching system (200). The method comprises restructuring (2:1) the URL into a format being readable by a DNS server, and sending (2:2) a DNS query comprising the restructured URL to the DNS server (206). Furthermore, the method comprises receiving (2:3) an IP-address of a cache (202a, 202b, 202c) in the distributed caching system (200), wherein the cache (202a, 202b, 202c) stores the object. Moreover, the method comprises sending (2:4) an http-get request for the object to the cache (202a, 202b, 202c) having the received IP-address, and receiving (2:5) an http-response comprising the object from the cache (202a, 202b, 202c).

Furthermore, the method may be repeated for retrieving further objects. Restructuring may be comprise removing a domain name from the URL, which results in a remaining part of the URL, replacing at least one slash "/" of the remaining part of the URL with a respective dot ".", reversing an order of the remaining part of the URL, and adding the removed domain name to the end of the reversed remaining part of the URL. Moreover, restructuring may comprise including a local cache domain name in the restructured URL.

According to another aspect, a data retrieving unit is provided which is adapted to be comprised in a communication network node and enable the communication network node to retrieve an object from a distributed caching system, the location of the object being defined by a Uniform Resource Locator, URL, the data retrieving unit comprising a communication interface and a processor. The processor is adapted to restructure the URL into a format being readable by a DNS server. The communication interface is adapted to send a DNS query comprising the restructured URL to the DNS server, and receive an IP-address of a cache in the distributed caching system the cache storing the object, The communication interface is further adapted to send an http-get request for the object to the cache having the received IP-address, and receive an http-response comprising the object from the cache.

Furthermore, the data retrieving unit may be adapted to retrieve at least one second object from a second cache. The data retrieving unit may also be adapted to receive the URL from a UE and forward the object to the UE.

According to other aspects, a UE and an http-proxy server, respectively, are provided which comprises the data retrieving unit.

By providing data retrieving units with functionality for restructuring URLs into a format which is readable by DNS-servers, and providing the DNS-servers with information regarding locations of object, the data retrieving unit may apply the fast looking up capability of the DNS-servers for finding locations of objects. Thereby, forwarding capacity of caches may be used for other purposes or less complex caches may be implemented.

BRIEF DESCRIPTION OF DRAWINGS

The solution will now be described in more detail by means of exemplary embodiments and with reference to the accompanying drawings, in which.

DETAILED DESCRIPTION

Further to the definition of object data, as stated above, objects can be stored in several caches and as such load sharing would also be possible to do on a more granular object DNS structure, or applying DNS policies for the objects so that some users get the objects from one location and other users get the objects from another location.

In order to achieve a more uniform load of servers and communication links in a communication network, objects are distributed on a plurality of caches. For instance, an initialising part of a music session, or a first text article of a web-page, will be stored as first objects at caches having short access times, and further parts of the music session or web-page could be stored as further objects at caches having longer access times. The end users may then fast get access to the initialising objects and could retrieve remaining objects while listening to or reading data of previously retrieved objects.

Within this description restructuring of URLs into a format readable by DNS servers will be described. The basic principle of the "restructuring" is to:
1. Remove the domain name from the URL, which results in a remaining part of the URL.
2. Replace slashes "/" of the remaining part of the URL with dots ".".
3. Reverse the order of the remaining part of the URL.
4. Attach the domain name to the end of the reversed remaining part of the URL.

For instance, when a URL is: "provider.com/apa/bepa/cepa.fig", removing the domain name "provider.com" results in the remaining part "apa/bepa/cepa.fig" of the URL. Replacing slashes with dots results in ".apa.bepa.cepa.fig". Reversing order of the remaining part of the URL results in "fig.cepa.bepa.apa", and adding the domain name to the end of the reversed remaining part of the URL results in "fig.cepa.bepa.apa.provider.com", which is a format which is readable by DNS servers.

Typically, a domain is a logic location of a server. A provider has set up one or more servers for storing objects. The provider is normally requested by the provider's domain name, e.g. the name of the provider and a top domain name, such as "provider.com".

However, it is to be noted that restructuring is not limited to the above described principle. A designer is free to devise any appropriate alternative principle for restructuring URLs, as long DNS servers are able to apply the restructured URLs. For instance, he/she may perform the actions 1-4 in an alternative order, or amend the URL into an alternative format which is readable by a DNS server.

The main benefit of restructuring is to create a hierarchical naming architecture which can be easy implemented in the current hierarchical DNS-system and provide an efficient scaling of the naming system.

Figure 1:
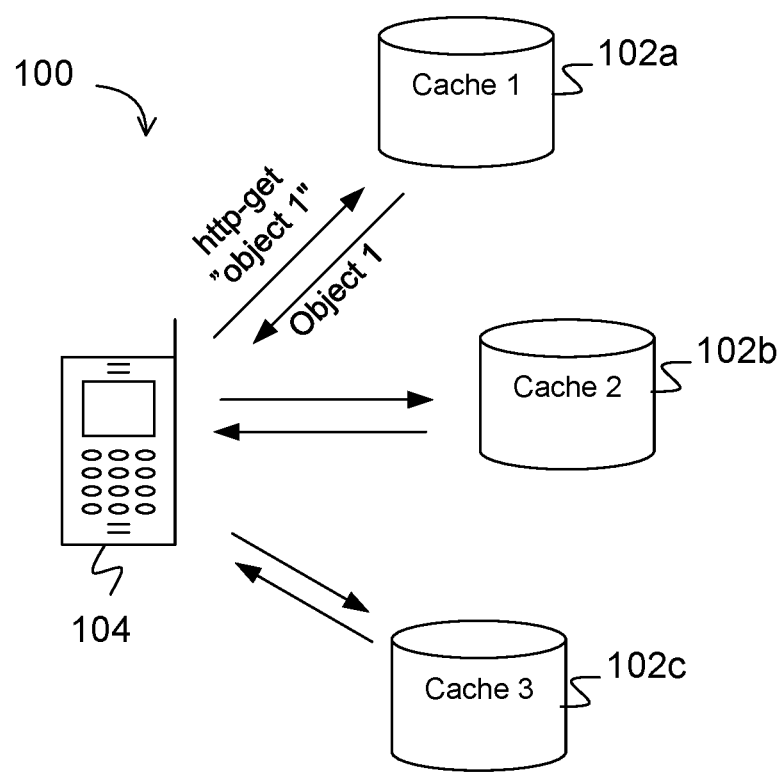
FIG. 1 is a schematic illustration of a situation in a caching system, in accordance with the prior art.
Figure 2:
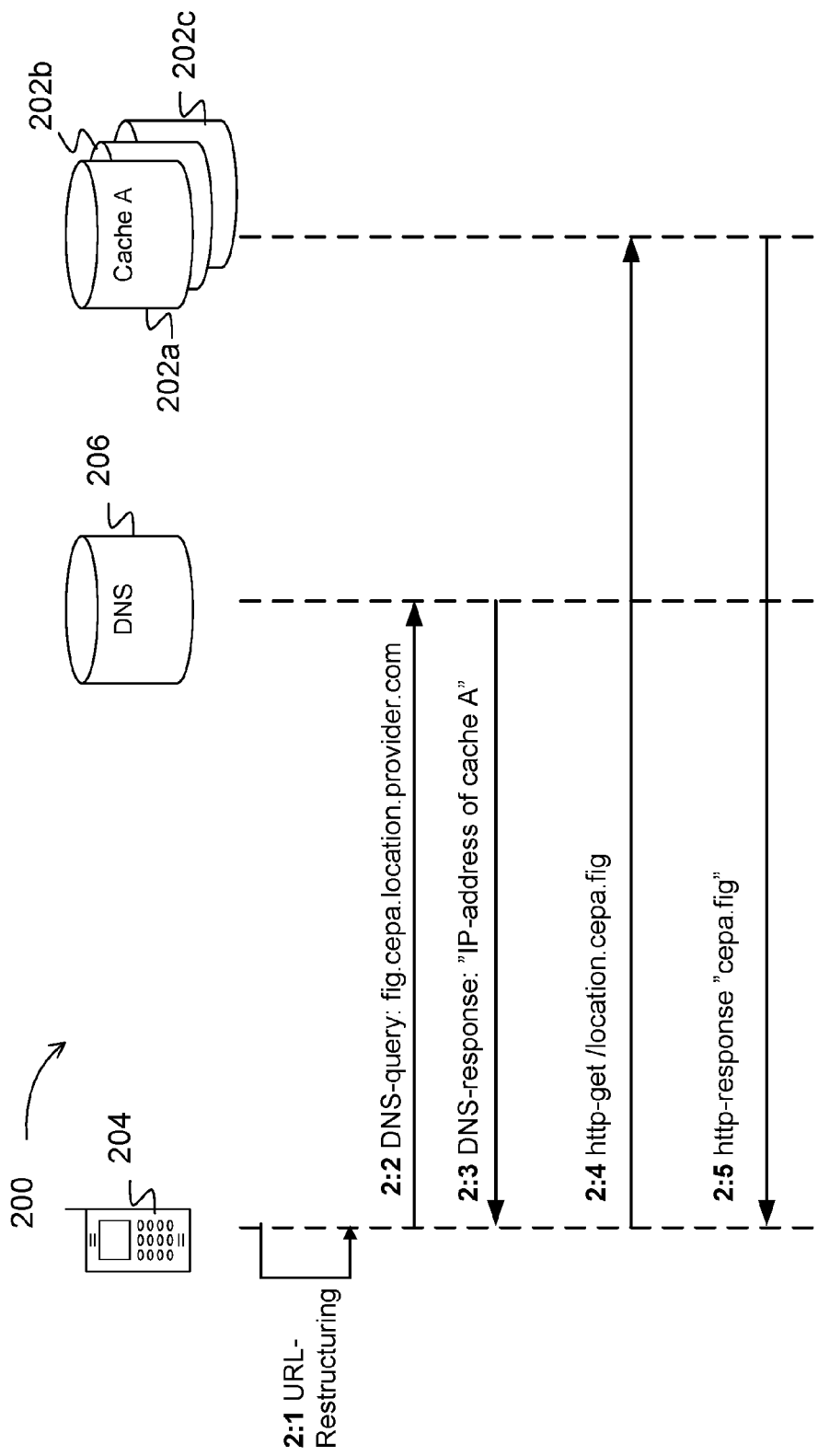
FIG. 2 is a schematic signalling chart of a scenario in a caching system, according to possible embodiments.

With reference to FIG. 2, which is a schematic signalling diagram, a scenario of retrieving object data from a distributed caching system 200, will now be described in accordance with one exemplifying embodiment.

The caching system 200 comprises a plurality of caches 202a, 202b, 202c that store objects that could be retrieved by UEs (User Equipments) of end users.

In this embodiment, a DNS server 206 has been provided with knowledge of how the objects are distributed on the caches 202a, 202b, 202c. When an end user of a UE 204 retrieves an object, e.g. an element of a web-page, in a first action 2:1, the UE 204 restructures, a URL (Uniform Resource Location) into a format which is readable by the DNS-server. The URL defines the object. For instance, the UE 204 knows that the object is stored at a domain "provider.com", however, the UE 204 does not know on which caches 202a, 202b, 202c, the provider stores the objects, e.g. an image named "cepa.fig" of the web-page.

In a following action 2:2, the UE 204 sends a DNS-query which comprises the restructured URL and the name of the wanted object to the DNS server 206. For instance, the UE 204 wants to retrieve the image "cepa.fig" of a web-page and sends a DNS-query "fig.cepa.location.provider.com to the DNS server 206. The term "location" is used in this embodiment to represent a location of the object "cepa.fig" within the cache. For instance, if the object "cepa.fig" is stored in a folder of the cache as "apa/bepa.cepa.fig", then "apa/bepa" is the location.

In a subsequent action 2:3, the UE 204 receives the IP-address of the cache in which the provider stores the image "fig". For instance, the image "cepa.fig" will be stored in a Cache A 202a.

Then, in another action 2:4, the UE sends a request for the object to this cache 202a, 202b, 202c, as an http-get "/location/cepa.fig" towards "IP-address of cache A". In a final action, then the UE 204 receives the wanted object, i.e. the image "cepa.fig" from the cache A 202a, 202b, 202c, as an http-response "cepa.fig".

In one alternative embodiment, which is based on the above described one, further objects, e.g. other elements of the web-page, may then be retrieved from the caches 202a, 202b, 202c where they are stored. By repeating the above described actions 2:1-2:5, i.e. restructuring URLs, obtaining the IP-addresses of the caches 202a, 202b, 202c, and obtaining the further objects from the appropriate caches 202a, 202b, 202c according to the respective IP-addresses, the end users may get access to further elements of e.g. a web-page. For instance, if a further object is stored in a cache B 202a, 202b, 202c, the UE 204 restructures the URL of object B in a repeated actions 2:1, requests the IP-address of cache B in a repeated action 2:2, receives the IP-address of cache B in a repeated action 2:3, orders the further object by using the IP-address of cache B in a repeated action 2:4, and receives the further object in a repeated action 2:5.

One advantage of the proposed method is that subsequent objects may be requested 2:4 before the currently retrieved object is received 2:5. Thereby the end user experience will be increased due to less latency in the downloading. In addition, DNS lookup is substantially faster than http redirecting, which further increases the end user experience Thus, by providing the DNS servers 206 with information regarding locations of object parts, the installed calculation capacity of fast DNS servers 206 may be applied for acquiring the appropriate IP-addresses of caches. Thereby, calculation capacity of the caches 202a, 202b, 202c may be released for other purposes, e.g. for handling the delivery of the object parts. Alternatively, the caches may be constructed with a less complex design.

In addition, when updating objects in a cache, information in other caches do not need to get updated to enable retrieval of the updated objects. The administrator does only need to update the DNS servers 206, which is fast and efficient, because in general the number of DNS servers is substantially lower than the number of caches.

Conventional UEs, i.e. UEs without functionality for restructuring URLs, will also be able of making use of the disclosed concept. However, these conventional UEs will then perform the retrieval of objects via http-proxy servers, which will be further described below.

Figure 3:
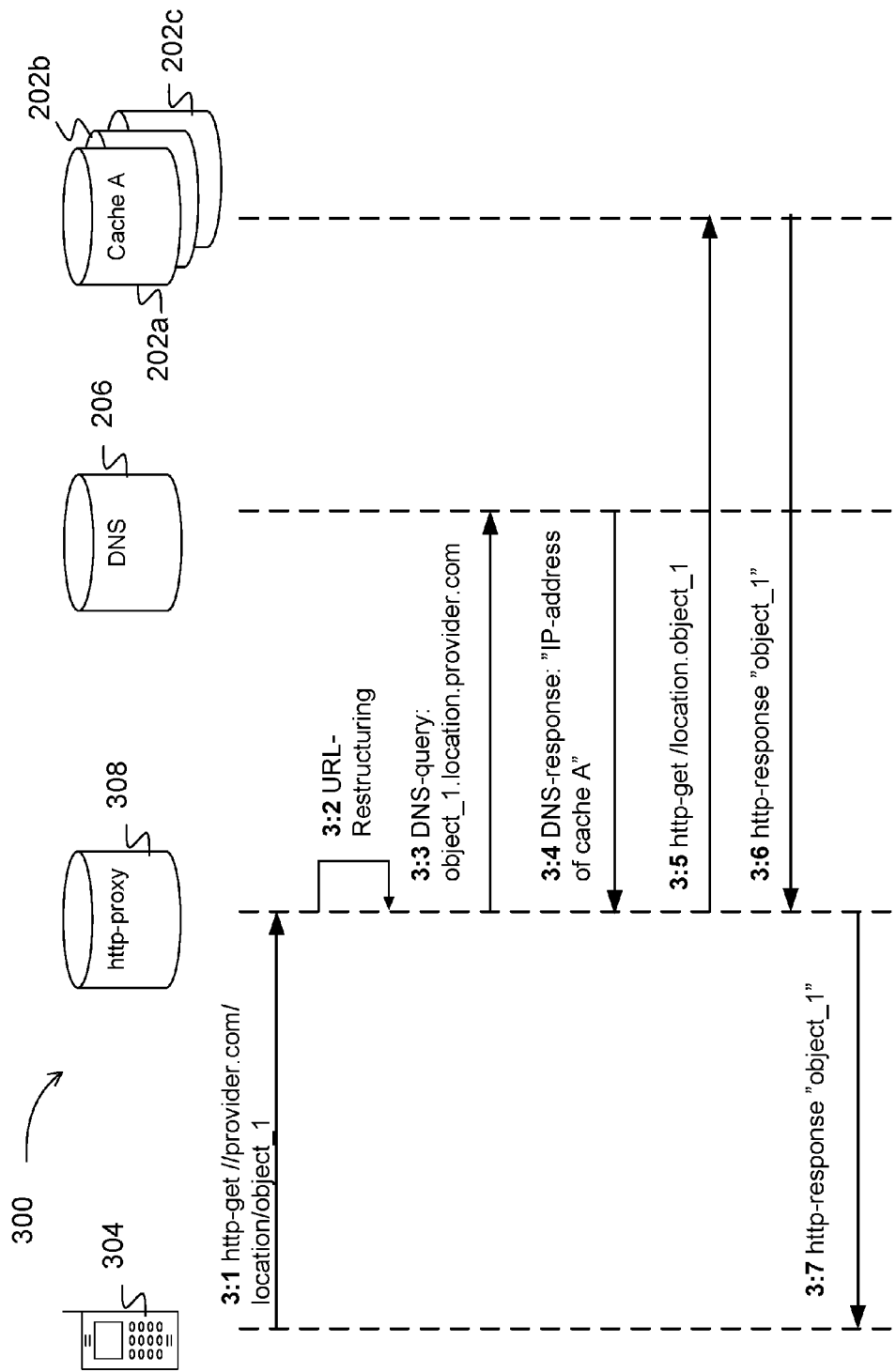
FIG. 3 is a schematic signalling chart of a scenario in a caching system, according to possible embodiments.

With reference to FIG. 3, which is a schematic signalling diagram, a scenario of retrieving object data from a distributed caching system 300, will now be described in accordance with one exemplifying embodiment.

The distributed caching system 300 of this exemplifying embodiment is related to the distributed caching system 200 of the FIG. 2, and the corresponding reference numbers are therefore applied when appropriate.

In addition to some above described exemplifying embodiments, this distributed caching system comprises an http-proxy server 308, arranged to control and manage retrieval of object data from a plurality of caches 202a, 202b, 202c.

When an end user of a UE 304 retrieves an object, e.g. a first part of a streamed music session, in a first action 3:1, the UE 304 sends a request to the http-proxy server for the first part. The first part is stored as an object in a first cache 202a, 202b, 202c, and is defined by a URL. In this embodiment the request is formed as an http-get comprising the URL, i.e. the name of the provider of the object, the location of the object, and the name of the object. For instance, the URL "provider.com/location/object_1", which means that the object 1 is stored at a location of the provider. The complete request is then http-get://provider.com/location/object_1

In a following action 3:2, the http-proxy server 308 restructures the received URL into a format which is readable by the DNS server 206. This restructured URL is then, in a subsequent action 3:3, sent as a DNS query to the DNS server. The actions 3:2 and 3:3 correspond to the respective actions 2:1 and 2:2 of one above described embodiment. In this embodiment, the http-proxy server 308 sends a DNS-query "object_1. location.provider" to the DNS server 206.

The DNS server 206 is aware of that the object 1 is stored at a cache A 202a. In a following action 3:4, which corresponds to the action 2:3 above, the DNS server returns the IP-address of cache A 202a in a DNS-response.

Then, in another action 3:5, the http-proxy server 308 sends a request for the object to this cache 202a, 202b, 202c implemented as http-get: "/location/object_1" to IP-address of cache A. Upon reception of the request, the cache A 202a returns the object A as an http-response "object_1", which the http-proxy server receives in a next action 3:6.

In a final action 3:7, then the http-proxy server 308 sends the received object to the UE 304, e.g. by forwarding the http-response "object_1".

Typically, a streamed session, a web-page, etc. are distributed as a plurality of objects on various caches 202a, 202b, 202c, and this plurality of objects will be retrieved.

Thus, by providing the distributed caching system 300 with the http-proxy server 308, also conventional UEs 304 will be enabled to retrieve objects from caches of a distributed caching system of the disclosed embodiments.

In an alternative exemplifying embodiment, which is based on the one above described embodiment, further objects, e.g. further parts of the streamed music session may then be retrieved from the caches 202a, 202b, 202c, where they are stored. In this alternative embodiment, the actions 3:1-3:7 are repeated for each respective object to be retrieved.

In a further exemplifying embodiment, which is based on some above described embodiments, the DNS-server 206 is connected to the Internet. In order to enable the http-proxy server 308 to send the DNS-query of action 3:3 to the appropriate DNS server 206, the domain name of the local caching system will be added to the DNS-query. For instance, if the DNS-query for a local system, which is not connected to the Internet is "DNS-query object_1.location.provider", the corresponding for a system connected to the Internet could be "DNS-query object_1.locataion.provider.cacheDomain.xx", where cacheDomain.xx is the domain name of the local caching system.

In order to enable a UE 204 or an http-proxy server 308 of some above described embodiments to retrieve distributed objects from a plurality of caches 202a, 202b, 202c, where the locations of the objects are registered at DNS-servers, the UE 204 and the http-proxy server 308 a data retrieving unit 400 are equipped with data retrieving units 400.

Figure 4:
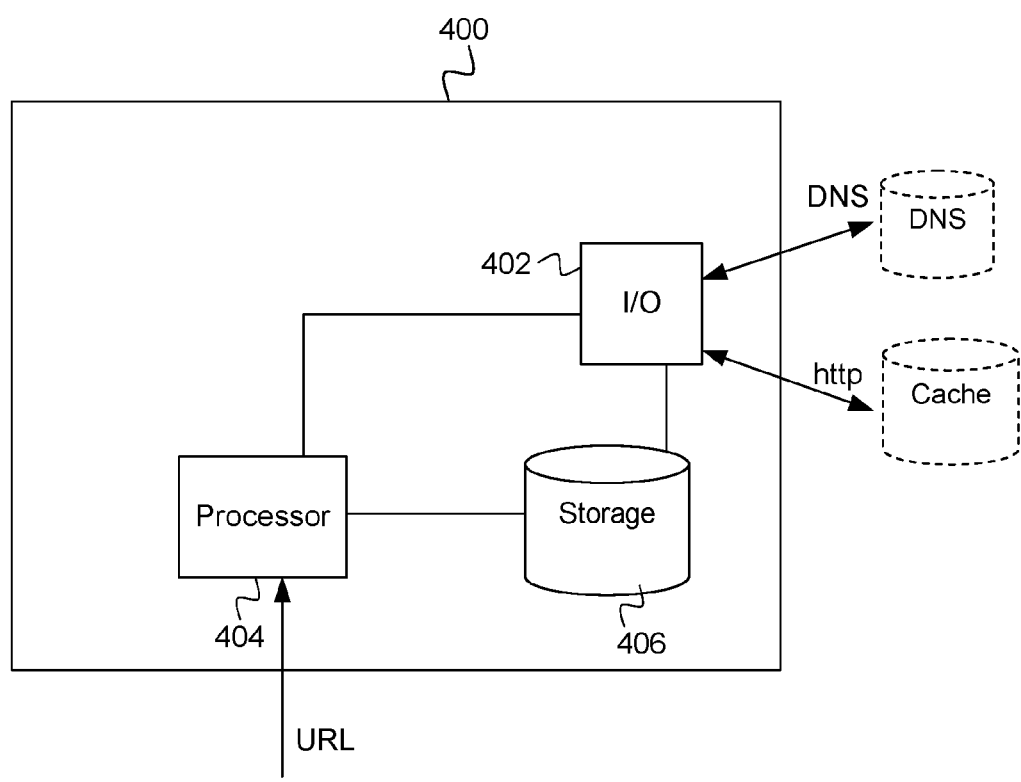
FIG. 4 is a schematic block diagram of a data retrieving unit, according to possible embodiments.

With reference to FIG. 4, which is a schematic block diagram, a data retrieving unit 400 will now be described in accordance with one exemplifying embodiment.

The data retrieving unit 400 is adapted to be arranged in a UE 204 or an http-proxy server 308 for retrieving object data from a plurality of caches of a distributed caching system. The object data is distributed as objects which are stored at the caches.

The data retrieving unit 400 comprises a communication interface 402 and a processor 404. The data retrieving unit 400 is adapted to receive a URL (Uniform Resource Locator) from the UE 204 or http-proxy server 308 within which it is arranged. The URL defines an object which the UE 204 or http-proxy server 308 wants to retrieve. The object of the URL is stored at a cache, but, the data retrieving unit is not aware of in which cache it is stored. The processor 404 is arranged to restructure the received URL into a format which is readable by a DNS server (dashed). One example of such restructuring has been described above, and will therefore not be further described in this embodiment.

The data retrieving unit 400 is adapted to lookup on which cache (dashed) the object to be retrieved on is stored, and the communication interface 402 is arranged to send a DNS query to a DNS server which has information regarding which cache that stores the wanted object. As disclosed above in another embodiment, the DNS query comprises the restructured URL, to be used by the DNS server when looking up an IP-address of the appropriate cache. Upon the DNS query, the DNS server, looks up the appropriate cache and returns an IP-address of that cache to the data retrieving unit 400, wherein the IP-address is supplemented to a DNS response. The communication interface 402 is adapted to receive the DNS response and is further adapted to send an HTTP request for the object to the cache which has the received IP-address. Typically, the HTTP request to be sent is formed by the processor 404 according to the received IP-address. However, the actual forming may be performed alternatively within the disclosed concept. For instance, the restructured URL may be stored in a storage means 406 and the communication interface may comprise functionality to form the HTTP request as an http-get message including the received IP-address and the stored restructured URL.

Furthermore, the communication interface 402 is adapted to receive the object to be retrieved by an http-response message.

In an alternative exemplifying embodiment, which is based on one above described embodiment, the data retrieving unit 400 comprises functionality for handling retrieval of further objects from the distributed caching system. In this embodiment, the processor 404 is adapted to handle and control retrieval of an appropriate number of objects.

In another exemplifying embodiment, which is based on some above described embodiments, the data retrieving unit 400 is adapted to be comprised in a UE 204 or an http-proxy server 308, which have been described in conjunction with the FIGS. 2 and 3, respectively.

It is to be noted that the arrangements of the described exemplifying embodiments are described in a non-limiting manner. Typically, a designer may select to arrange further units and components in to provide appropriate operation of the data retrieving unit 400, within the described concept, e.g. various control units and memories may be arranged. Moreover, physical implementations of the proposed arrangements may be performed alternatively within the disclosed concept. For instance, functionality of a specific illustrated unit may be implemented in another suitable unit when put into practice.

Figure 5:
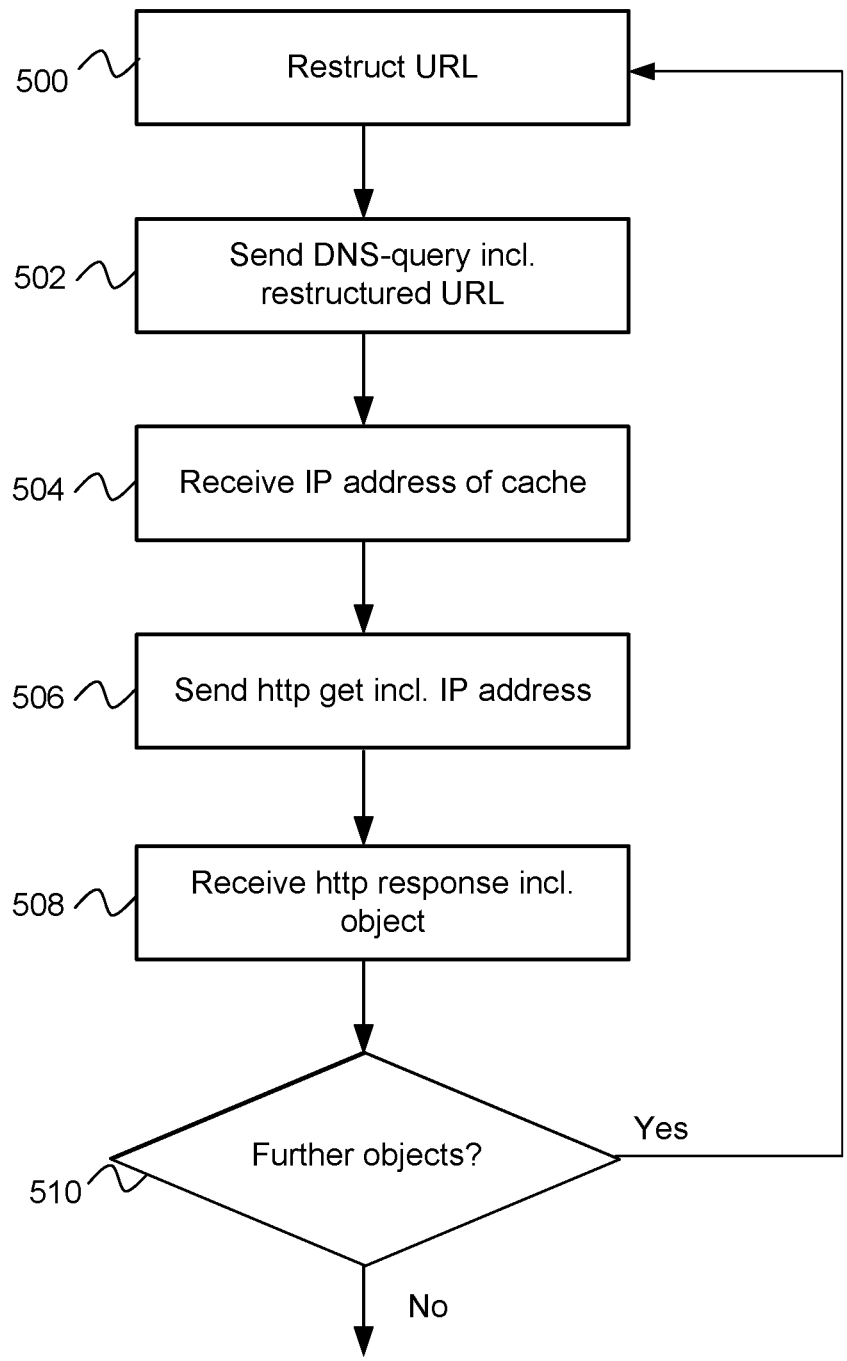
FIG. 5 is a schematic flow chart of a method of retrieving object data, according to possible embodiments.
Figure 6:
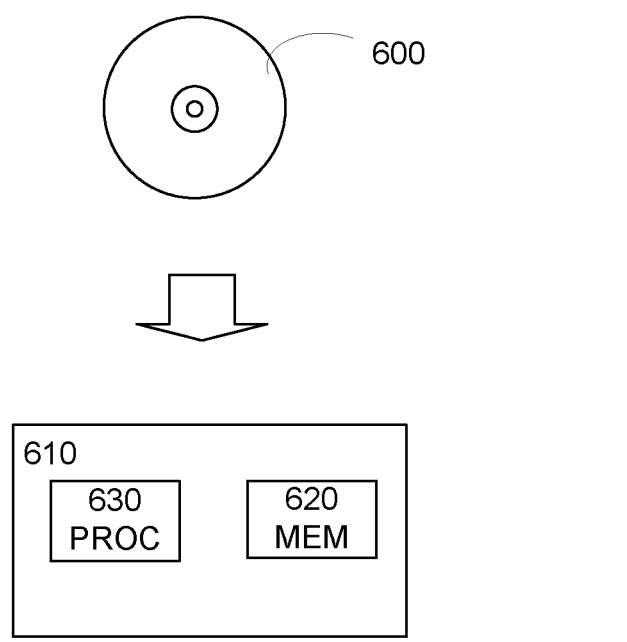
FIG. 6 is a schematic view and a schematic block diagram of a computer program product, according to possible embodiments.

With reference to FIG. 5, which is a schematic flow chart, a method performed by a data retrieving unit will now be described in accordance with one exemplifying embodiment.

When a data retrieving unit retrieves object data from a distributed cache system, the following actions are performed by the data retrieving unit.

In a first action 500, the data retrieving unit restructures a URL of an object, e.g. an element of a web-page. The URL is restructured into a format which is readable by a DNS server. The principle of the restructuring has already been described above in this description and will therefore not be further described.

In a following action 502, the restructured URL is sent to a DNS-server as a DNS-query. Upon reception of the restructured URL, the DNS-server returns an IP-address of a cache which stores the object to be retrieved, and in a subsequent action 504 the data retrieving unit receives this IP-address.

In another following action 506, the data retrieving unit request the object from the cache which has the received IP-address, and receives the object in response from the cache, in a following action 508.

In a final optional action 510, the data retrieving unit determines if there are more objects to be retrieved. If there is no more to be retrieved the process ends.

If instead, there are more objects to be retrieved, the data retrieving unit repeats the actions 500 to 510 for a next object, until the determination of action 510 indicates that there is not more objects to be retrieved.

According to some exemplifying embodiments, a computer program product comprises a computer readable medium such as, for example, a diskette or a CD-ROM as illustrated by 600 in FIG. 5. The computer readable medium may have stored thereon a computer program comprising program instructions. The computer program may be loadable into a data-processing unit 630, which may, for example, be comprised in a data retrieving unit 610. When loaded into the data-processing unit 630, the computer program may be stored in a memory 620 associated with or integral to the data-processing unit 630. According to some embodiments, the computer program may, when loaded into and run by the data-processing unit 630, cause the data-processing unit 630 to execute method steps according to, for example, the methods shown in any of the FIGS. 2, and 3, respectively.

It is to be noted that the arrangements of the described exemplifying embodiments are described in a non-limiting manner. Typically, a designer may select to arrange further units and components to provide appropriate operation of the receivers, within the described concept, e.g. further processors or memories. Moreover, physical implementations of the proposed arrangements may be performed alternatively within the disclosed concept. For instance, functionality of a specific illustrated unit may be implemented in another suitable unit when put into practice.

Furthermore, even if the exemplifying embodiments have been described for DNS-servers looking up IP-addresses, the disclosed concept is not limited thereto. A designer realises and understands that alternative servers or the like may be applied for looking up addresses for caches according to alternative address formats.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

ABBREVIATIONS

DNS Domain Name System
HTTP HyperText Transfer Protocol
IP Internet Protocol
UE User Equipment
URL Uniform Resource Locator

The invention claimed is:

1. A method performed by a communication network node, the method comprising:
   obtaining a Uniform Resource Locator (URL) that defines a location of an object in a distributed caching system, the URL specifying a folder identifier and an object name;
   restructuring the URL into a format being readable by a Domain Name System (DNS) server, the restructuring including modifying an ordering of the folder identifier and the object name, wherein the restructuring further includes reversing an ordering of a plurality of path segments of the folder identifier, and wherein in the modified ordering the folder identifier is provided before the object name;
   sending a DNS query comprising the restructured URL to the DNS server;
   receiving an Internet Protocol (IP)-address of a cache in the distributed caching system, the cache storing the object;
   sending a Hypertext Transfer Protocol (htpp)-get request for the object to the cache having the received IP-address; and
   receiving an http-response comprising the object from the cache.

2. The method of claim 1, wherein at least one second object is stored in a second cache of the distributed caching system, the at least one second object being defined by a second URL, and the method further comprises:
   restructuring the second URL into a format being readable by the DNS server;
   sending a second DNS query comprising the restructured second URL to the DNS server;
   receiving an IP-address of the second cache from the DNS server;
   sending an http-get request for the at least one second object to the second cache by applying the IP-address of the second cache; and
   receiving a second http-response comprising the at least one second object from the second cache.

3. The method of claim 1, wherein restructuring the URL comprises:
   removing a domain name from the URL, resulting in a remaining part of the URL,
   replacing at least one slash "/" of the remaining part of the URL with respective dots ".",
   reversing an order of the remaining part of the URL, and adding the removed domain name to the end of the reversed remaining part of the URL.

4. The method of claim 1, wherein the communication network node is a User Equipment (UE).

5. The method of claim 1, wherein the communication network node is a proxy server, the method further comprising receiving the URL from a UE and forwarding the object to the UE.

6. The method of claim 5, wherein at least one second object is stored in a second cache of the distributed caching system, the at least one second object being defined by a second URL, and the method further comprising receiving the second URL from the UE and forwarding the at least one second object to the UE.

7. The method of claim 5, wherein the proxy server is adapted to be connected to the Internet, and the restructuring of the URL comprises including a local cache domain name in the restructured URL.

8. The method of claim 1, wherein the object is an information element of one from a set of: a web-page, a streamed media session, and a media part.

9. A data retrieving unit in a communication network node, the data retrieving unit comprising:
   a processor to:
      obtain a Uniform Resource Locator (URL) that defines a location of an object in a distributed caching system, the URL specifying a folder identifier and an object name; and
      restructure the URL into a format being readable by a Domain Name System (DNS) server, the restructure including modifying an ordering of the folder identifier and the object name, wherein the restructuring further includes reversing an ordering of a plurality of path segments of the folder identifier, and wherein in the modified ordering the folder identifier is provided before the object name; and
   a communication interface coupled to the processor, the communication interface to:
      send a DNS query comprising the restructured URL to the DNS server;
      receive an Internet Protocol (IP)-address of a cache in the distributed caching system, the cache storing the object;
      send a Hypertext Transfer Protocol (http)-get request for the object to the cache having the received IP-address; and
      receive an http-response comprising the object from the cache.

10. The data retrieving unit of claim 9, wherein at least one second object is stored in a second cache of the distributed caching system, the at least one second object is defined by a second URL, wherein the processor is further adapted to restructure the second URL into a format being readable by the DNS server, and wherein the communication interface is further adapted to:
    send a second DNS query comprising the restructured second URL to the DNS server,
    receive an IP-address of the second cache from the DNS server,
    send an http-get request for the at least one second object to the second cache by applying the IP-address of the second cache, and
    receive a second http-response comprising the second object data from the second cache.

11. The data retrieving unit of claim 10, wherein the communication interface is further adapted to receive a second URL from a UE, and forward the second object to the UE.

12. The data retrieving unit of claim 9, wherein the communication interface is further adapted to receive the URL from a UE, and forward the object to the UE.

13. The data retrieving unit of claim 9, wherein the communication network node comprises a User Equipment (UE).

14. The data retrieving unit of claim 9, wherein the communication network node comprises a proxy server.

15. The data retrieving unit of claim 14, wherein the proxy server is adapted to be connected to the Internet, and wherein the processor is adapted to include a local cache domain in the restructured URL.

16. A non-transitory computer readable medium having stored thereon a computer program comprising program instructions that, when executed, perform operations comprising:
   obtaining a Uniform Resource Locator (URL) that defines a location of an object in a distributed caching system, the URL specifying a folder identifier and an object name;
   restructuring the URL into a format being readable by a Domain Name System (DNS) server, the restructuring including modifying an ordering of the folder identifier and the object name, wherein the restructuring further includes reversing an ordering of a plurality of path segments of the folder identifier, and wherein in the modified ordering the folder identifier is provided before the object name;
   sending a DNS query comprising the restructured URL to the DNS server;
   receiving an Internet Protocol (IP)-address of a cache in the distributed caching system, the cache storing the object;
   sending a Hypertext Transfer Protocol (htpp)-get request for the object to the cache having the received IP-address; and
   receiving an http-response comprising the object from the cache.

* * * * *

UNITED STATES PATENT AND TRADEMARK OFFICE
CERTIFICATE OF CORRECTION

PATENT NO. : 10,284,677 B2  
APPLICATION NO. : 15/115167  
DATED : May 7, 2019  
INVENTOR(S) : Hans Eriksson et al.

Page 1 of 1

It is certified that error appears in the above-identified patent and that said Letters Patent is hereby corrected as shown below:

On the Title Page

Column 1, item (*) Notice, delete "This patent is subject to a terminal disclaimer."

Signed and Sealed this  
Twenty-seventh Day of August, 2019

Andrei Iancu  
*Director of the United States Patent and Trademark Office*